United States Patent
Wang

(10) Patent No.: US 12,286,865 B2
(45) Date of Patent: Apr. 29, 2025

(54) DRILL SPEEDER AND DRILLING DEVICE

(71) Applicant: Ruiqi Wang, Nanjing (CN)

(72) Inventor: Ruiqi Wang, Nanjing (CN)

( * ) Notice: Subject to any disclaimer, the term of this patent is extended or adjusted under 35 U.S.C. 154(b) by 0 days.

(21) Appl. No.: 17/045,489

(22) PCT Filed: May 14, 2018

(86) PCT No.: PCT/CN2018/086660
§ 371 (c)(1),
(2) Date: Oct. 6, 2020

(87) PCT Pub. No.: WO2019/196159
PCT Pub. Date: Oct. 17, 2019

(65) Prior Publication Data
US 2021/0156198 A1    May 27, 2021

(30) Foreign Application Priority Data
Apr. 9, 2018 (CN) .......................... 201810309588.7

(51) Int. Cl.
*E21B 4/00* (2006.01)
*E21B 17/10* (2006.01)
*F16H 1/28* (2006.01)

(52) U.S. Cl.
CPC .......... *E21B 4/006* (2013.01); *E21B 17/1014* (2013.01); *F16H 1/28* (2013.01)

(58) Field of Classification Search
CPC ......... E21B 4/006; E21B 17/1014; F16H 1/28
See application file for complete search history.

(56) References Cited

U.S. PATENT DOCUMENTS

| | | | | |
|---|---|---|---|---|
| 2,701,123 | A * | 2/1955 | Moore | E21B 4/006 475/260 |
| 2016/0084006 | A1* | 3/2016 | Marland | E21B 4/006 175/320 |

* cited by examiner

*Primary Examiner* — D. Andrews
(74) *Attorney, Agent, or Firm* — Ziegler IP Law Group, LLC.

(57) ABSTRACT

A drill speeder. The drill speeder is used for increasing the rotating speed of a drill bit in drilling operation and comprises: an upper joint (1) connected to a drill tool (200) in the drilling operation; a lower joint connected to the drill bit (300); and three wing plates (9) arranged on the outer surface of a gear sleeve (10) of the drill speeder in an equal division mode, and closely attached to pistons embedded on the gear sleeve (10). When the drill bit (300) conducts a speed increasing operation, a drilling slurry column in the drill speeder jacks up the pistons (8) on the gear sleeve (10), and the wing plates (9) are opened and attached to the well wall. The drill speeder further comprises a sun shaft (12) and planetary gears (4). The upper joint (1) is a planetary gear support provided with three support shafts in the axial direction of the drill tool, the support shafts are sleeved with the planetary gears (4), and the planetary gears (4) are engaged with a sun shaft gear and inner teeth of the gear sleeve (10) simultaneously, and the sun shaft (12) serves as the lower joint to be connected to the drill bit (300) and drives the drill bit (300) to conduct speed increasing rotation. A pawl (3) is provided on the upper joint (1). When the planetary gears (4) fail in transmission, the pawl (3) is inserted into a tooth groove of the sun shaft (12) to push the sun shaft (12) to rotate at the rotating speed of the drill tool. The drill speeder can increase the drilling speed of the drill bit to achieve the speed increasing effect.

11 Claims, 4 Drawing Sheets

DRILL SPEEDER AND DRILLING DEVICE

TECHNICAL FIELD

The present invention relates to the technical field of well drilling equipment, and more particularly, to a drill bit speed increaser and a well drilling device.

BACKGROUND ART

In the existing well drilling process, a drilling speed of a drill bit can be increased just by adjusting a drilling machine. For example, as shown in FIG. 1, the drilling machine drives the drill bit to perform a well drilling operation by connecting a drill bit to a drilling tool. The API standard of a turntable speed of the existing drilling machine is controlled to 110 rpm or less. Generally, a DC motor is used to implement stepless speed regulation, which is beneficial to wellbore stability and the reduction of fatigue damage of the drilling tool. However, it is always the goal pursued by drilling operations to increase the cutting speed of the drill bit and to obtain a higher rate of penetration (ROP). At present, screws or turbines are often used at home and abroad to increase the cutting speed of the drill bit at the shaft bottom. Because the screws and turbines are driven by flow energy of mud, their power is small and the actual use time is also short. In particular, the screws and turbines cannot meet the needs of the petroleum industry for increasing the drill bit speed and for reducing the oilfield development cost. Moreover, if the rotating speed is directly increased on the drilling machine, it will cause the twisting and fatigue damage of the drilling tool, and at the same time affect the stability of the well wall. The increased drilling speed of the drilling machine will be absorbed by the deformation of the drilling tool, and cannot be fully transferred to the drill bit, so the speed increase cannot be achieved.

The patent document CN101319596B discloses a short-range speed-increasing hard rock deep hole driller, including a drilling machine that provides power for drilling, a drill rod connected to the drilling machine, and a drill bit, wherein a speed increaser is arranged at a position close to the drill bit between the drill rod and the drill bit; one end of the speed increaser is connected with an input shaft, and the input shaft is connected with the drilling machine; an output shaft is arranged at the other end of the speed increaser and connected with the drill bit. A sleeve is arranged outside the speed increaser, the input shaft and the output shaft, and has an outer diameter not greater than a diameter of the drill bit. The sleeve is provided with a longitudinal sliding groove, the speed increaser is provided with a sliding key, and the sliding key is placed in the sliding key groove, so that the speed increaser can only move axially along the sliding key groove of the sleeve. A clamping device for fixing the sleeve on a drilled hole wall is arranged on the sleeve. This clamping device can have a variety of structural forms. One of the structural forms is to provide three axial clamping grooves in one end of the sleeve close to the drill bit, wherein a movable jaw connected with the sleeve is arranged in each clamping groove, and a bearing is arranged on each jaw; shaft sections of different diameters are processed at one end of the output shaft of the speed increaser, this end being connected with the drill bit; a tapered transitional section is provided between every two adjacent shaft sections of different diameters; a bearing on each claw cooperates with the tapered transitional section and a large-shaft-diameter section of the output shaft. When the output shaft extends forward out of the sleeve, the claws are stretched to fix the sleeve onto the wall of the hole drilled in advance. The output shaft is movably connected with the drill bit, and a compression spring is arranged at the junction of the output shaft and the drill bit. When the drill bit is resisted by rock and fails to move forward, the output shaft can continue to move forward for a certain distance to compress the compression spring. In the process of advancing, a conical surface of the output shaft is in contact with the bearings on the claws to stretch the claws. In the patent document CN101319596B, a speed increaser that can increase the speed of a drill bit is mentioned.

SUMMARY OF THE INVENTION

An embodiment of the present invention provides a drill bit speed increaser and a well drilling device, which are directed to solve the problem of the lack of a reliable, stable and low-cost solution to increase a speed of a drill bit in existing drilling operations.

An embodiment of the present invention provides a drill bit speed increaser, which is used for increasing a rotating speed of a drill bit in a well drilling operation. The drill bit speed increaser comprises an upper joint, a lower joint, a gear sleeve and three wing plates.

The upper joint is connected with a drilling tool in the well drilling operation; and the lower joint is connected with the drill bit. The three wing plates are arranged on the outer edge face of the gear sleeve of the drill bit speed increaser in an equal division mode, and each wing plate is closely attached to two pistons arranged on the gear sleeve. When the drill bit operates at an increased speed, a drilling mud column in the drill bit speed increaser jacks up the pistons on the gear sleeve, and the wing plates are stretched and attached to the well wall.

The drill bit speed increaser further comprises a sun shaft and planetary gears. The upper joint is a planetary gear carrier provided with three supporting shafts in an axial direction of the drilling tool; the supporting shafts are sleeved with the planetary gears; and the planetary gears are in internal gearing with a sun shaft gear and the gear sleeve simultaneously. The sun shaft serves as the lower joint to be connected with the drill bit, and drives the drill bit to rotate at an increased speed.

A pawl is arranged on the upper joint. When the planetary gears fail in transmission, the pawl is inserted into a tooth groove of the sun shaft, so as to push the sun shaft to rotate at a rotating speed of the drilling tool.

An embodiment of the present invention provides a well drilling device, which comprises a drilling machine, a drilling tool, a drill bit speed increaser and a drill bit. One end of the drilling tool is connected with the drilling machine, and the other end of the drilling tool is connected with the drill bit speed increaser. The upper joint of the drill bit speed increaser is connected with the drilling tool, and the lower joint of the drill bit speed increaser is connected with the drill bit.

The drill bit speed increaser is used for increasing a rotating speed of the drill bit in a well drilling operation and comprises an upper joint, a lower joint, a gear sleeve and three wing plates.

The upper joint is connected with the drilling tool in the well drilling operation; and the lower joint is connected with the drill bit. The three wing plates are arranged on the outer edge face of the gear sleeve of the drill bit speed increaser in an equal division mode, and each wing plate is closely attached to two pistons arranged on the gear sleeve. During the operation of the drill bit, a drilling mud column in the drill bit speed increaser jacks up the pistons on the gear sleeve, and the wing plates are stretched and attached to the well wall.

The drill bit speed increaser further comprises a sun shaft and planetary gears. The upper joint is a planetary gear carrier provided with three supporting shafts in an axial direction of the drilling tool; the supporting shafts are sleeved with the planetary gears; and the planetary gears are in internal gearing with a sun shaft gear and the gear sleeve simultaneously. The sun shaft serves as the lower joint to be connected with the drill bit, and drives the drill bit to rotate at an increased speed. A pawl is arranged on the upper joint of the drill bit speed increaser. When the planetary gears fail in transmission, the pawl is inserted into a tooth groove of the sun shaft, so as to push the sun shaft to rotate at a rotating speed of the drilling tool.

One of the beneficial effects of the embodiments of the present invention resides in that: by adding the drill bit speed increaser to the well drilling device, the cutting speed of the drill bit is increased by about 3-4 times, the drilling speed is doubled, and the drilling cost is saved.

One of the beneficial effects of the embodiments of the present invention resides in that: through the technical principle of a planetary gear set, the purpose of increasing the rotating speed of the drill bit is achieved.

One of the beneficial effects of the embodiments of the present invention residues in that: the wing plate structure is designed outside the gear sleeve to ensure the stability of the well wall, and the torque output is generated through the relative fixation of the wing plates and the well wall, thereby achieving a good speed increasing effect.

The embodiments of the present invention can be widely used in the fields of well drilling and exploration, including but not limited to, fields such as oil drilling and exploration, coalbed methane exploration, shale gas exploration, and offshore oil and gas exploration.

Compared with the prior art, the speed increaser in the embodiment of the present invention has the following advantages.

1) The speed of the drill bit is increased by 3-4 times. The rotating speed of the drilling tool conforms to the international standards, without any influence on the increase in damages to the stability of the well wall and the fatigue of the drilling tool, in the case that the drill bit obtains a high-speed cutting capability.

2) There is no requirement for mud performance and purification degree, but the existing speed-increasing tools such as screws have high requirements for mud performance and purification.

3) A linear shear rate of the drill bit is increased by more than 3 times, and the rate of penetration during well drilling is also increased by about 3 times, which shortens the well drilling cycle and greatly reduces the well drilling cost. In a low oil price environment, it is of great significance to oilfield exploration and development.

BRIEF DESCRIPTION OF THE DRAWINGS

By reading the following detailed description with reference to the accompanying drawings, the above and other objects, features, and advantages of the exemplary embodiments of the present invention will be apparent to understand. In the drawings, several embodiments of the present invention are shown in an exemplary and non-limiting manner, in which.

Reference symbols represent the following components: 100—drilling machine; 200—drilling tool; 300—drill bit; 400—drill bit speed increaser; 500—wellbore; 1—upper joint; 2—sun shaft centralizing bearing; 3—pawl; 4—planetary gear; 5—anti-drop pin; 6—thrust bearing; 7—gear sleeve centralizing bearing; 8—piston; 9—wing plate; 10—gear sleeve; 11—lower centralizing bearing; 12—sun shaft.

DETAILED DESCRIPTION

Figure 1:
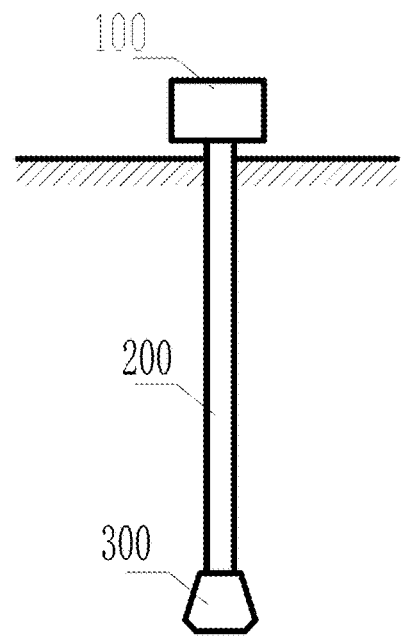
FIG. 1 is a schematic diagram of the existing well drilling device.
Figure 2:
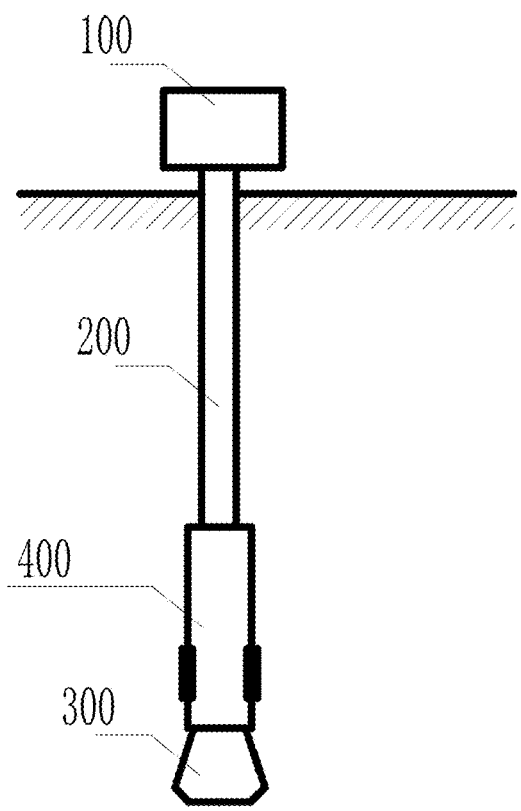
FIG. 2 is a schematic diagram of a well drilling device in accordance with an embodiment of the present invention.

According to one or more embodiments, as shown in FIG. 2, a well drilling device comprises a drilling machine, a drilling tool, a drill bit speed increaser, and a drill bit. One end of the drilling tool is connected with the drilling machine, and the other end of the drilling tool is connected with the drill bit speed increaser. The upper joint of the drill bit speed increaser is connected with the drilling tool, and the lower joint of the drill bit speed increaser is connected with the drill bit. Here, the drilling tool may be a drill rod. The upper joint and the drill rod can be connected by threads; and the lower joint and the drill bit can be connected by threads.

Figure 3:
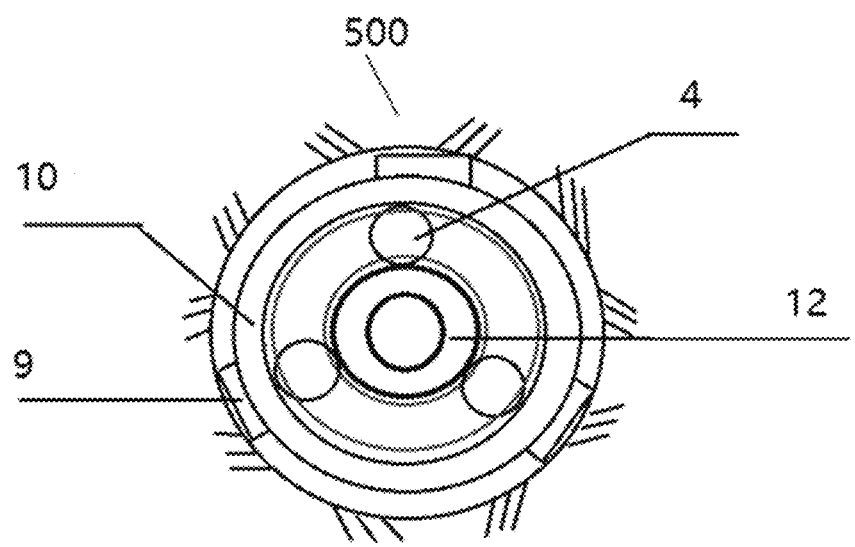
FIG. 3 is a bottom view showing a working state of a near-bit speed increaser in accordance with an embodiment of the present invention.
Figure 6:
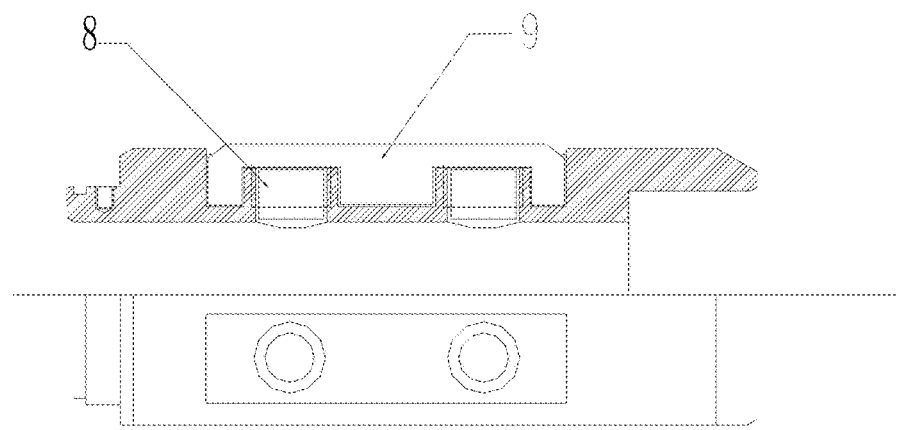
FIG. 6 is a schematic diagram showing a closed state of wing plates in accordance with an embodiment of the present invention.
Figure 7:
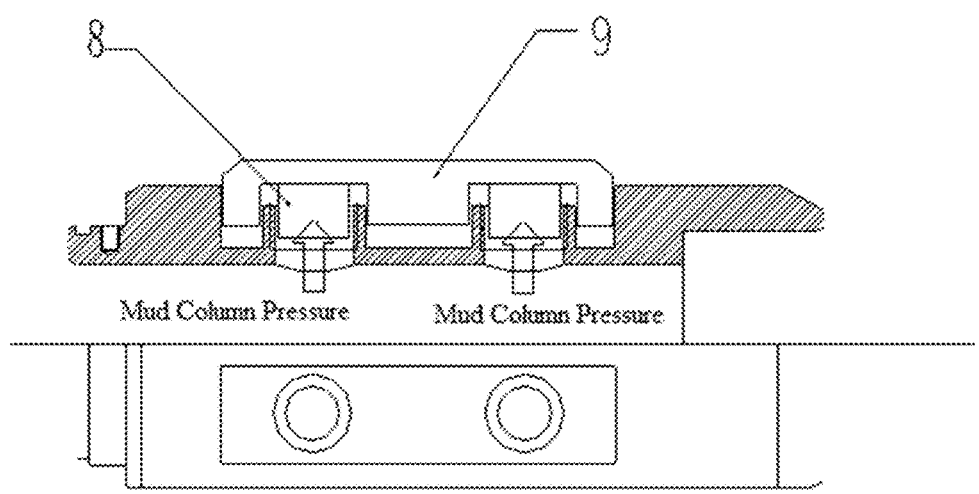
FIG. 7 is a schematic diagram when the wing plates are stretched in accordance with an embodiment of the present invention.

According to one or more embodiments, in conjunction with FIGS. 3, 6 and 7, there is provided a drill bit speed increaser, which is used for increasing a rotating speed of the drill bit in a well drilling operation. The drill bit speed increaser comprises:

an upper joint connected with the drilling tool in the well drilling operation;
a lower joint connected with the drill bit;
a gear sleeve; and
three wing plates, which are arranged on the outer edge face of the gear sleeve of the drill bit speed increaser in an equal division mode, and are closely attached to pistons arranged on the gear sleeve. When the drill bit operates at an increased speed, a drilling mud column in the drill bit speed increaser jacks up the pistons on the gear sleeve, and the wing plates in this case are stretched and attached to the well wall. Each wing plate is closely attached to two pistons arranged on the gear sleeve.

As shown in FIG. 3, the drill bit speed increaser in accordance with an embodiment of the present invention, which is in pup connection with the drilling tool, is a speed increase mechanism integrated by the gear shifting principle. The drill bit speed increaser has the same working principle as the gear shifting principle. A wing plate fixing mechanism is designed on the gear sleeve. The wing plates are driven by a drilling mud column pressure and is relatively fixed to the well wall. When the gear set works, the wing plates are stretched/extended out and fixed to the well wall under the action of the mud column pressure, thereby ensuring that the speed increaser can generate a speed change and transfer a torque.

Figure 4:
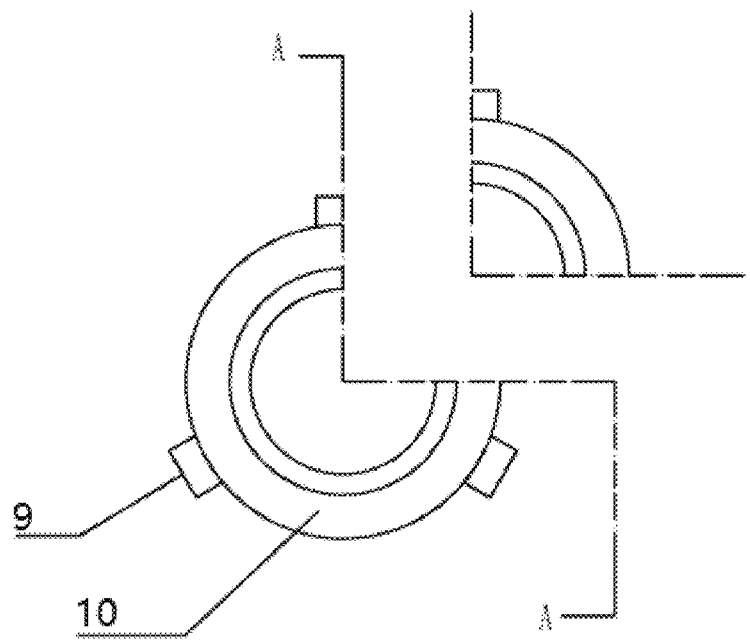
FIG. 4 is a sectional view of a drill bit speed increaser in accordance with an embodiment of the present invention.
Figure 5:
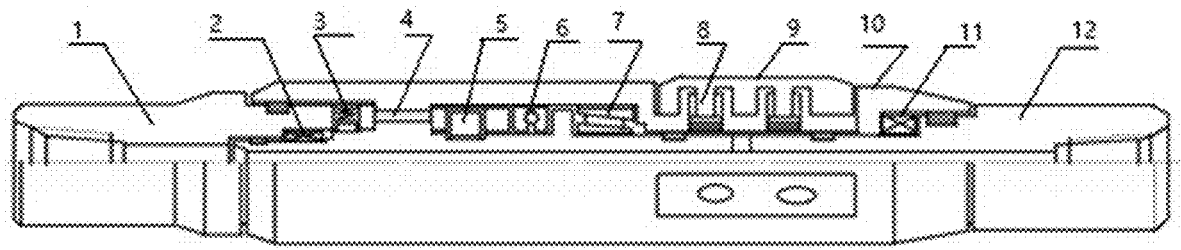
FIG. 5 is an axial schematic view of a plane A according to FIG. 4 in the embodiment of the present invention.

According to one or more embodiments of the invention, referring to FIGS. 3, 4 and 5, a drill bit speed increaser may further comprise a sun shaft and planetary gears. The upper joint is a planetary gear carrier provided with three supporting shafts in an axial direction of the drilling tool; the supporting shafts are sleeved with the planetary gears; and the planetary gears are in internal gearing with a sun shaft gear and the gear sleeve simultaneously. The sun shaft serves as the lower joint to be connected with the drill bit and drives the drill bit to rotate at an increased speed.

According to one or more embodiments, as shown in FIG. 5, a pawl is arranged on the upper joint. When the planetary gears fail in transmission, the pawl is inserted into a tooth groove of the sun shaft, so as to push the sun shaft to rotate at a rotating speed of the drilling tool.

According to one or more embodiments, as shown in FIG. 5, the drill bit speed increaser comprises a thrust bearing installed on the sun shaft and used to transfer an axial thrust of the upper joint to the drill bit.

According to one or more embodiments, as shown in FIG. 5, the drill bit speed increaser comprises an anti-drop pin, which is arranged on the sun shaft and used to prevent the sun shaft and the drill bit from dropping from the drilling tool and the gear sleeve.

According to one or more embodiments, as shown in FIG. 5, the drill bit speed increaser comprises a sun shaft centralizing bearing, a gear sleeve centralizing bearing and a lower centralizing bearing. The sun shaft centralizing bearing and the gear sleeve centralizing bearing respectively support the sun shaft and the gear sleeve on the upper part of the drill bit speed increaser, so that the sun shaft and the gear sleeve do not swing from side to side during rotation. The lower centralizing bearing is used to centralize the sun shaft and the gear sleeve on the lower part of the drill bit speed increaser in cooperation with the sun shaft centralizing bearing and the gear sleeve centralizing bearing, so as to prevent a center shaft from shifting.

According to one or more embodiments, referring to FIGS. 3, 4, 5, 6 and 7, there is provided a drill bit speed increaser, which is used for increasing a rotating speed of the drill bit in a well drilling operation. The drill bit speed increaser comprises:

an upper joint for connection with the drilling tool in the well drilling operation;
a lower joint for connection with the drill bit;
a gear sleeve; and
three wing plates which are arranged on the outer face of the gear sleeve of the drill bit speed increaser in an equal spacing manner, and are closely attached to pistons embedded on the gear sleeve. When the drill bit operates at an increased speed, a drilling mud column in the drill bit speed increaser jacks up the pistons on the gear sleeve, and the wing plates in this case are stretched and attached to the well wall. Each wing plate is closely attached to two pistons arranged on the gear sleeve.

The drill bit speed increaser further comprises a sun shaft and planetary gears. The upper joint is a planetary gear carrier provided with three supporting shafts in an axial direction of the drilling tool; the supporting shafts are sleeved with the planetary gears; and the planetary gears are in internal gearing with a sun shaft gear and the gear sleeve simultaneously. The sun shaft serves as the lower joint to be connected with the drill bit, and drives the drill bit to rotate at an increased speed.

A pawl is arranged on the upper joint. When the planetary gears fail in transmission, the pawl is inserted into a tooth groove of the sun shaft, so as to push the sun shaft to rotate at a rotating speed of the drilling tool. The drill bit speed increaser comprises a thrust bearing installed on the sun shaft and used to transfer an axial thrust of the upper joint to the drill bit. The drill bit speed increaser comprises an anti-drop pin which is arranged on the sun shaft and used to prevent the sun shaft and the drill bit from dropping from the drilling tool and the gear sleeve.

The drill bit speed increaser comprises a sun shaft centralizing bearing, a gear sleeve centralizing bearing and a lower centralizing bearing. The sun shaft centralizing bearing and the gear sleeve centralizing bearing respectively support the sun shaft and the gear sleeve on the upper part of the drill bit speed increaser, so that the sun shaft and the gear sleeve do not swing from side to side during rotation. The lower centralizing bearing is used to centralize the sun shaft and the gear sleeve on the lower part of the drill bit speed increaser in cooperation with the sun shaft centralizing bearing and the gear sleeve centralizing bearing, so as to prevent a center shaft from shifting.

The upper joint serves as a planetary gear carrier, and drives the planetary gears to drive the sun shaft gear to rotate. At the same time, the upper joint applies a drilling pressure to the drill bit through the thrust bearing, and is connected to a lower structure of the drill bit speed increaser through the anti-drop pin. The sun shaft centralizing bearing can reduce a rotation resistance between the upper joint and the sun shaft, and play a centralizing role. The pawl is used to prevent the speed increaser from rotating at double speed after the gear set fails, and is embedded onto the upper joint. The gear sleeve forms a variable speed gear set through the planetary gears. The gear sleeve is fixed relative to the well wall through the wing plates, thereby ensuring that the gear set can transfer a torque normally. The three wing plates are arranged on the gear sleeve at an included angle of 120° between every two wing plates, and are associated with the mud column pressure in a riser through pistons of a hydraulic system of the wing plates. After a pump is turned on, the wing plates are pushed out to be relatively fixed to the well wall. The speed increaser is directly connected to the drill bit.

Figure 8:
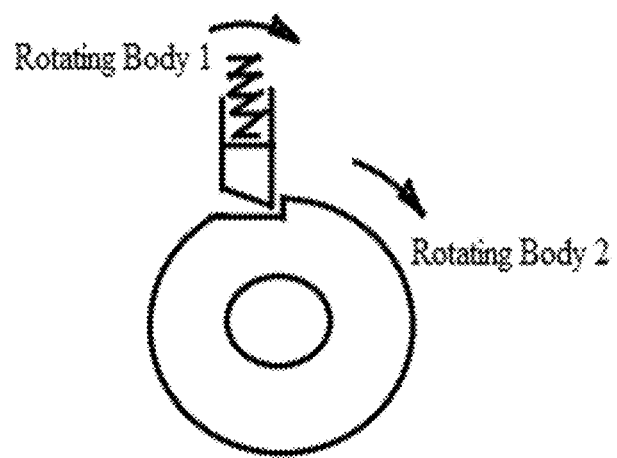
FIG. 8 is a schematic diagram of a ratchet principle of an upper joint in accordance with an embodiment of the present invention.

According to one or more embodiments, a working principle of the ratchet mechanism is shown in FIG. 8. The sun shaft in the drill bit speed increaser serves as a rotating body 2. The pawl serves as a rotating body 1, and is arranged on the upper joint. When the speed of the rotating body 2 is greater than that of the rotating body 1, the rotating body 2 rotates. When the rotating speed of the rotating body 2 is less than that of the rotating body 1, the rotating body 1 drives the rotating body 2 to rotate, thereby ensuring that the speed increaser can work at double speed when the gear shift of the speed increaser fails.

According to one or more embodiments, a drill bit speed increaser is for use in a drilling speed increaser in an 8 and a half inch hole. The gear sleeve has 42 internal teeth and a maximum outer diameter of 208 mm. The sun shaft gear has 20 teeth and a minimum inner diameter of 38 mm. Each planetary gear has 12 teeth and a modulus of 4. The speed increaser has a total length of 1680 mm, and a speed increase of 3.1 folds.

The field test is successful performed in two wells. In April 2017, the speed increasers are set into an $E_2F_1$ mudstone formation in Xu 50 Well (2468 m), with a drilling depth of 19.26 m for each speed increaser. The fastest drilling speed is 4 min/m, which is an increase of 3.75 folds, as compared with the conventional drilling tool which has a drilling speed of 15 min/m.

On Nov. 16, 2017, in He X7 Well (2208 m), a speed increaser test was successfully performed for the second time in a formation $E_2F_2$.

Statistical Table of Drilling Time for Test of Speed Increaser in He X7 Well

| Well depth m | Drilling time min/m |
|---|---|
| 2044 | 9 |
| 2045 | 19 |
| 2046 | 13 |
| 2047 | 19 |
| 2048 | 19 |
| 2049 | 13 |
| 2050 | 8 |
| 2051 | 7 |
| 2052 | 7 |
| 2093 | 9 |
| 2094 | 6 |
| 2095 | 6 |
| 2096 | 6 |
| 2097 | 6 |
| 2098 | 6 |
| 2106 | 3 |
| 2107 | 4 |
| 2108 | 4 |
| 2109 | 4 |
| 2110 | 4 |
| 2111 | 2 |
| 2112 | 2 |
| 2113 | 2 |
| 2114 | 3 |
| 2130 | 3 |
| 2131 | 3 |
| 2132 | 3 |
| 2133 | 3 |
| 2134 | 5 |
| 2135 | 5 |

When the speed increaser is just entering the well, in order to prevent the performances of the tool from being affected by coring and reaming operations on a well section, the drilling time is equivalent to that of the drilling speed of the conventional drilling tool. When the speed increaser enters a well depth of 2050 m, the tool operates at an increased speed normally, with a total of 98 m of drilling and an average drilling time of 6 min/m. The fastest drilling time is 2 min/m in a well depth of 2112 meters. The effect is very good and the test is successful.

It is worth noting that although the foregoing content has described the spirit and principle of the present invention with reference to several specific embodiments, it should be understood that the present invention is not limited to the disclosed specific embodiments. The division of various aspects does not mean that the features in these aspects cannot be combined. This division is only for the convenience of description. The present invention is intended to cover various modifications and equivalent arrangements included within the spirit and scope of the appended claims.

What is claimed is:

1. A drill bit speed increaser for increasing a rotating speed of a drill bit in a well drilling operation, comprising:
   an upper joint for connection with a drilling tool in the well drilling operation;
   a lower joint for connection with the drill bit;
   a gear sleeve;
   at least three wing plates arranged on the outer face of the gear sleeve of the drill bit speed increaser in an equal spacing manner and closely attached to pistons embedded on the gear sleeve, wherein when it is desired to operate the drill bit at an increased speed, a drilling mud column in the drill bit speed increaser jacks up the pistons on the gear sleeve, thereby the wing plates are extended and attach to a well wall; and
   a sun shaft and planetary gears,
   wherein the upper joint is a planetary gear carrier provided with at least three supporting shafts in an axial direction of the drilling tool, the supporting shafts are sleeved with the planetary gears, and the planetary gears are in internal gearing with a sun shaft gear and the gear sleeve simultaneously; and the sun shaft serves as the lower joint to be connected with the drill bit and drives the drill bit to rotate at an increased speed, and
   wherein a pawl is arranged on the upper joint, and when the planetary gears fail in transmission, the pawl is inserted into a tooth groove of the sun shaft so as to push the sun shaft to rotate at a rotating speed of the drilling tool.

2. The drill bit speed increaser according to claim 1, wherein each of the at least three wing plates is closely attached to two pistons arranged on the gear sleeve.

3. The drill bit speed increaser according to claim 1, further comprising a thrust bearing installed on the sun shaft and used to transfer an axial thrust of the upper joint to the drill bit.

4. The drill bit speed increaser according to claim 1, further comprising an anti-drop pin which is arranged on the sun shaft and used to prevent the sun shaft and the drill bit from dropping from the drilling tool and the gear sleeve.

5. The drill bit speed increaser according to claim 1, further comprising a sun shaft centralizing bearing, a gear sleeve centralizing bearing, and a lower centralizing bearing,
   wherein the sun shaft centralizing bearing and the gear sleeve centralizing bearing, respectively, support the sun shaft and the gear sleeve on the upper part of the drill bit speed increaser such that the sun shaft and the gear sleeve do not swing from side to side during rotation; and
   the lower centralizing bearing is used to centralize the sun shaft and the gear sleeve on the lower part of the drill bit speed increaser in cooperation with the sun shaft centralizing bearing and the gear sleeve centralizing bearing so as to prevent a center shaft from shifting.

6. A well drilling device, comprising:
   a drilling machine;
   a drilling tool;
   the drill bit speed increaser according to claim 1; and
   a drill bit,
   wherein one end of the drilling tool is connected with the drilling machine, and the other end of the drilling tool is connected with the drill bit speed increaser, and
   the upper joint of the drill bit speed increaser is connected with the drilling tool, and the lower joint of the drill bit speed increaser is connected with the drill bit.

7. The well drilling device according to claim 6, wherein the drill bit speed increaser comprises a thrust bearing installed on the sun shaft and used to transfer an axial thrust of the upper joint to the drill bit; and the drill bit speed increaser comprises an anti-drop pin which is arranged on the sun shaft and used to prevent the sun shaft and the drill bit from dropping from the drilling tool and the gear sleeve.

8. The well drilling device according to claim 6, wherein the drill bit speed increaser comprises a sun shaft centralizing bearing, a gear sleeve centralizing bearing, and a lower centralizing bearing, wherein the sun shaft centralizing bearing and the gear sleeve centralizing bearing respectively support the sun shaft and the gear sleeve on an upper part of the drill bit speed increaser such that the sun shaft and the gear sleeve do not swing from side to side during rotation; and the lower centralizing bearing is used to centralize the sun shaft and the gear sleeve on a lower part of the drill bit speed increaser in cooperation with the sun shaft centralizing bearing and the gear sleeve centralizing bearing so as to prevent a center shaft from shifting.

9. A drill bit speed increaser for increasing a rotating speed of a drill bit in a well drilling operation, comprising:

an upper joint for connection with a drilling tool in the well drilling operation;

a lower joint for connection with the drill bit;

a gear sleeve;

at least three wing plates arranged on the outer face of the gear sleeve of the drill bit speed increaser in an equal spacing manner and closely attached to pistons embedded on the gear sleeve, wherein when it is desired to operate the drill bit at an increased speed, a drilling mud column in the drill bit speed increaser jacks up the pistons on the gear sleeve, thereby the wing plates are extended and attach to a well wall;

a sun shaft and planetary gears; and a thrust bearing installed on the sun shaft and used to transfer an axial thrust of the upper joint to the drill bit, wherein the upper joint is a planetary gear carrier provided with at least three supporting shafts in an axial direction of the drilling tool, the supporting shafts are sleeved with the planetary gears, and the planetary gears are in internal gearing with a sun shaft gear and the gear sleeve simultaneously; and the sun shaft serves as the lower joint to be connected with the drill bit and drives the drill bit to rotate at an increased speed.

10. A drill bit speed increaser for increasing a rotating speed of a drill bit in a well drilling operation, comprising:

an upper joint for connection with a drilling tool in the well drilling operation;

a lower joint for connection with the drill bit;

a gear sleeve;

at least three wing plates arranged on the outer face of the gear sleeve of the drill bit speed increaser in an equal spacing manner and closely attached to pistons embedded on the gear sleeve, wherein when it is desired to operate the drill bit at an increased speed, a drilling mud column in the drill bit speed increaser jacks up the pistons on the gear sleeve, thereby the wing plates are extended and attach to a well wall;

a sun shaft and planetary gears; and an anti-drop pin which is arranged on the sun shaft and used to prevent the sun shaft and the drill bit from dropping from the drilling tool and the gear sleeve, wherein the upper joint is a planetary gear carrier provided with at least three supporting shafts in an axial direction of the drilling tool, the supporting shafts are sleeved with the planetary gears, and the planetary gears are in internal gearing with a sun shaft gear and the gear sleeve simultaneously; and the sun shaft serves as the lower joint to be connected with the drill bit and drives the drill bit to rotate at an increased speed.

11. A drill bit speed increaser for increasing a rotating speed of a drill bit in a well drilling operation, comprising:

an upper joint for connection with a drilling tool in the well drilling operation;

a lower joint for connection with the drill bit;

a gear sleeve;

at least three wing plates arranged on the outer face of the gear sleeve of the drill bit speed increaser in an equal spacing manner and closely attached to pistons embedded on the gear sleeve, wherein when it is desired to operate the drill bit at an increased speed, a drilling mud column in the drill bit speed increaser jacks up the pistons on the gear sleeve, thereby the wing plates are extended and attach to a well wall;

a sun shaft and planetary gears, wherein the upper joint is a planetary gear carrier provided with at least three supporting shafts in an axial direction of the drilling tool, the supporting shafts are sleeved with the planetary gears, and the planetary gears are in internal gearing with a sun shaft gear and the gear sleeve simultaneously; and the sun shaft serves as the lower joint to be connected with the drill bit and drives the drill bit to rotate at an increased speed, the well drilling device further comprising a sun shaft centralizing bearing, a gear sleeve centralizing bearing, and a lower centralizing bearing, wherein the sun shaft centralizing bearing and the gear sleeve centralizing bearing, respectively, support the sun shaft and the gear sleeve on the upper part of the drill bit speed increaser such that the sun shaft and the gear sleeve do not swing from side to side during rotation; and wherein the lower centralizing bearing is used to centralize the sun shaft and the gear sleeve on the lower part of the drill bit speed increaser in cooperation with the sun shaft centralizing bearing and the gear sleeve centralizing bearing so as to prevent a center shaft from shifting.

* * * * *